No. 834,650. PATENTED OCT. 30, 1906.
F. WOLF.
CULTIVATOR.
APPLICATION FILED APR. 11, 1906.

2 SHEETS—SHEET 1.

WITNESSES:

INVENTOR
Frank Wolf.

By W. J. FitzGerald
Attorneys

No. 834,650. PATENTED OCT. 30, 1906.
F. WOLF.
CULTIVATOR.
APPLICATION FILED APR. 11, 1906.
2 SHEETS—SHEET 2.
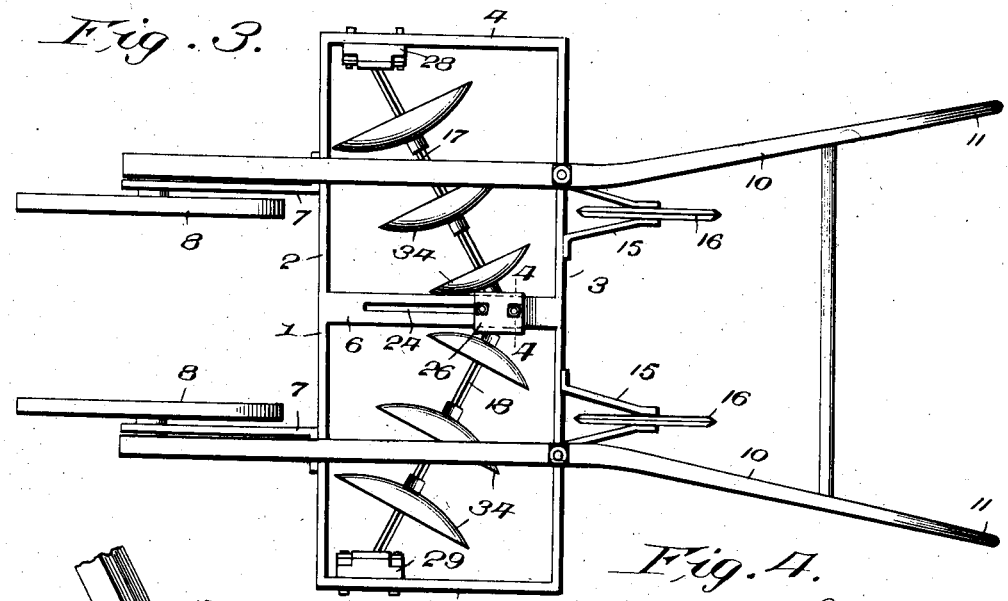
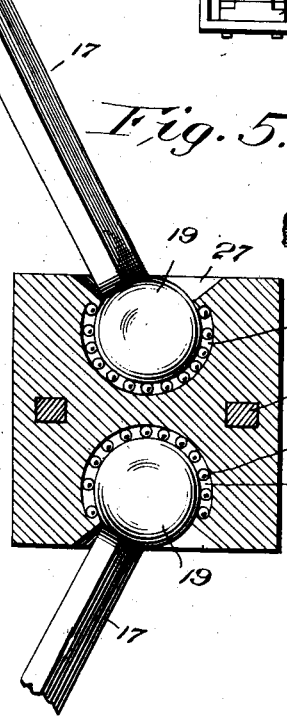
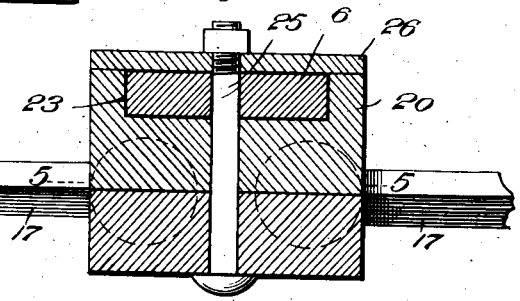
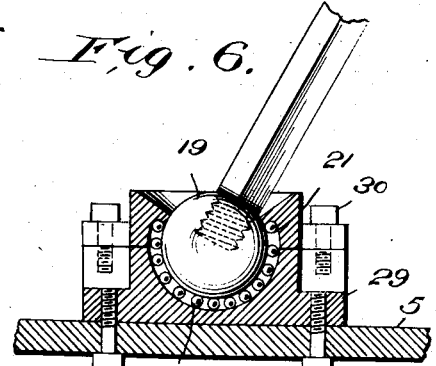
WITNESSES:
INVENTOR
Frank Wolf
By W. J. FitzGerald
Attorneys the preferred form of my invention.
UNITED STATES PATENT OFFICE.

FRANK WOLF, OF CLACKAMAS, OREGON.

CULTIVATOR.

No. 834,650.   Specification of Letters Patent.   Patented Oct. 30, 1906.

Application filed April 11, 1906. Serial No. 311,100.

*To all whom it may concern:*

Be it known that I, FRANK WOLF, a citizen of the United States, residing at Clackamas, in the county of Clackamas and State of Oregon, have invented certain new and useful Improvements in Cultivators; and I do hereby declare the following to be a full, clear, and exact description of the invention, such as will enable others skilled in the art to which it appertains to make and use the same.

My invention relates to new and useful improvements in cultivators, and more particularly to that class known as hand-cultivators, wherein a frame is mounted upon wheels and provided with a handle to propel the same, the frame having rotatable disks mounted thereon.

The object of my invention is to provide a device of this character which can be easily and readily operated and one which is cheap in construction.

A further object is to provide interchangeable devices whereby the earth can be moved to or from a given row.

A still further object is to provide regulating means whereby the depth to which the disks enter into the ground may be changed.

Other objects and advantages will be hereinafter made clearly apparent in the specification and pointed out in the claims.

In the accompanying drawings, which are made a part of this application, I have shown the preferred form of my invention.

Figure 1:
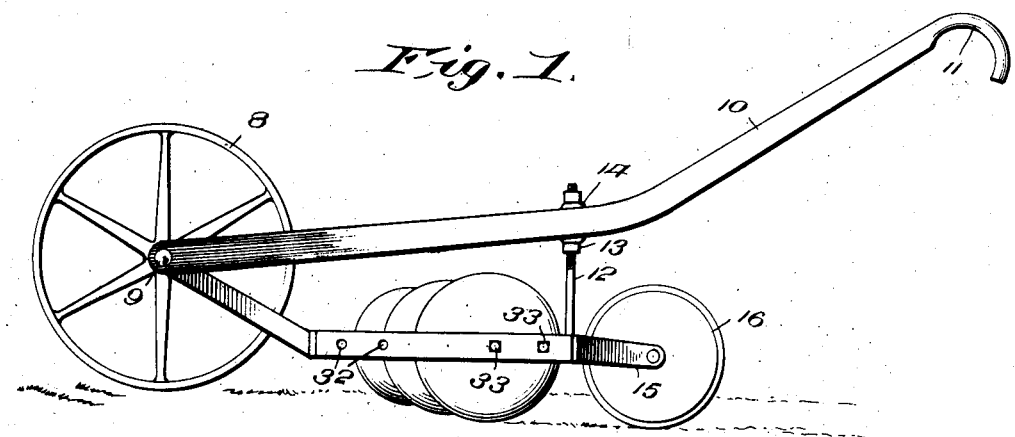
Figure 2:
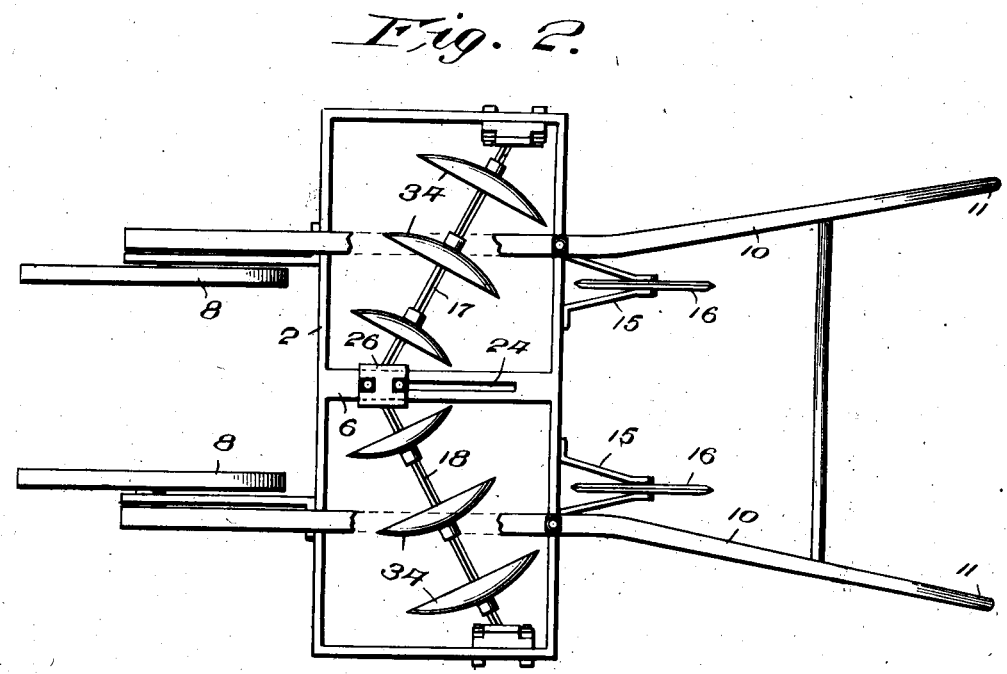

In said drawings, Figure 1 is a side elevation of my improved device. Fig. 2 is a top plan view thereof with parts thereof broken away, showing the cutting-blades arranged to throw the earth toward the growing plants. Fig. 3 is a top plan view of the device, showing the blades arranged to throw the earth away from the growing plants. Fig. 4 is an enlarged detail sectional view as seen from the dotted line 4 4, Fig. 3. Fig. 5 is a detail sectional view as seen from the dotted line 5 5, Fig. 4; and Fig. 6 is a detail sectional view, on an enlarged scale, showing the bearing for the opposite end of the shaft from that shown in Figs. 4 and 5.

Referring to the figures by numerals of reference, 1 indicates the frame of my device, said frame comprising elongated side walls 2 and 3, end walls 4 and 5, and a central bar 6. The wall 2 has secured thereto forwardly and upwardly projecting arms 7, said arms having wheels 8 pivotally secured thereto.

The shafts 9, connecting said arms and wheels, project beyond the edge of said arms and have mounted thereon one end of the controlling-handles 10, said handles extending rearwardly across the frame 1 and terminating in curved hand engaging members 11 at their rear ends. Bars 12 are secured to the side wall 3 and extend upwardly through the controlling-handles 10 and are adjustably secured thereto by means of adjusting-nuts 13 and 14, taking onto the threaded ends of said bars 12. The wall 3 is also provided with rearwardly-extending arms 15, between the outer ends of which are rotatably-mounted guiding-wheels 16, said wheels being preferably wedge-shaped or sharpened around their outer periphery, so that they will readily take into the ground.

Rotatably mounted within the frame 1 and on opposite sides of the bar 6 are shafts 17 and 18, said shafts being preferably rectangular in cross-section and provided at each end with circular heads or balls 19, the circular head on one end of said shaft being formed, preferably, integral therewith, while the head at the opposite end is provided with a threaded socket, into which takes the threaded end of the shaft.

Secured to the bar 6 and slidably mounted thereon is a bearing 20, said bearing being composed of sections and provided with sockets 21, into which take the balls 19 at one end of the shafts 17 and 18, the sockets 21 being larger in circumference than the heads 19 and forming a race therearound, in which are placed a plurality of balls 22, against which the heads 19 bear. The upper section of the bearing 20 is provided with a channel 23, in which is seated the bar 6, said bar having an elongated slot 24 therein, through which take clamping-bolts 25, said clamping-bolts passing through both sections of the bearing 20 and through a clamping-plate 26, placed over the top of the bar 6. The mouths 27 of the sockets 21 are flared to permit the shafts 17 and 18 to be moved in opposite directions. The opposite ends of the shafts 17 and 18 are provided with bearings 28 and 29, respectively, said bearings also being provided with sockets 21 and havings balls 22 therein, said bearings being composed of two members and secured together by means of bolts 30, as best shown in Fig. 6 of the drawings. The bearings 28 and 29 are secured to the end walls 4 and 5, respectively, by means of stud-bolts 31, said end walls 4 and 5 being each provided with two sets of holes 32 and 33, respectively, through which said bolts 31 are adapted to take. The object of having two sets of holes 32 and 33 is to provide means for locating the bearings 28 and 29 at either end of the end walls 4 and 5, respectively, for a purpose to be hereinafter set forth. In the drawings I have shown the shafts 17 and 18, provided with a plurality of blades or disks 34, said disks being varied in size; but it will be understood that, if preferred, said disks may be of the same size throughout.

In Figs. 1 and 2 of the drawings the shafts are arranged so that the disks 34 will direct the earth toward the center of the machine when pushed forward, and when in this position the bearing 20 is placed at the forward end of the slot 24 in the bar 6 and the bearings 28 and 29 secured, respectively, to those ends of the end walls 4 and 5 having the openings 33 therein.

In Fig. 3 of the drawings I have shown the shafts 17 and 18 reversed from the position shown in Figs. 1 and 2 and the disks so arranged upon said shafts that by a forward movement of the machine the earth will be directed away from the growing plants, and this result is accomplished by moving the bearing 20 to the rear end of the slot 24 and placing the bearings 28 and 29, respectively, at that end of the walls 4 and 5 having the openings 32 therein. It will also be seen that the disks 34 are reversed upon their respective shafts. The class of disks herein shown are adapted more particularly to be used in cultivating small plants, it being readily understood that by placing the small disks next to the row containing the plants they will be directed but a short distance into the ground and therefore direct but a very small quantity of the soil toward the growing plants or away from them, as desired, while by having the larger disks disposed out into the center of the row the earth at this point will be entered to a greater depth. When, however, the plant has reached a state of maturity where the direction of more or less earth toward or away from the same will not greatly affect it, the disks are preferably all of the same size. The depth to which the disks are directed into the earth is regulated through the medium of the bars 12 and adjustable nuts 13 and 14. It will also be seen that, if desired, the shafts 17 and 18 may be turned end for end, thereby obviating the necessity of changing the disks upon said shafts when it is desired to change the course of the earth toward or away from the plants. I have shown this construction as applied to a hand-cultivator; but the same may be used with equal success upon a larger machine, wherein it requires draft-animals to operate the same.

What I claim is—

1. A cultivator of the class described comprising a frame, bearings secured to said frame, said bearings having sockets therein, shafts having heads thereon adapted to take into said sockets, bearing-balls in said sockets and surrounding said heads, disks mounted upon said shafts, said bearings being movably secured to the frame to vary the position of said shafts and disks whereby the earth will be moved toward or away from the growing plants, guide members secured to said frame, and means to control the operation of said cultivator.

2. The herein-described cultivator comprising a frame, bearings secured to each end of said frame and being movably mounted thereon, a central bearing slidably mounted on said frame, all of said bearings having sockets therein, disk-carrying shafts having heads at the ends thereof, one of the heads on each of said shafts being removably secured thereto, means to secure said heads in said sockets, and guiding means for said frame and disks.

3. A cultivator comprising the combination with a frame having end and side walls and a slotted bar between the side walls; of shafts having heads at each end thereof, one of said heads being removable, disks removably secured to said shafts, a longitudinally-movable bearing mounted upon the slotted bar, said bearing having sockets therein adapted to receive the heads on the inner ends of said shafts, bearings for the outer ends of said shafts and adapted to be secured at different points on the end walls of the frame, said bearings being so arranged that the longitudinal direction of the shafts may be changed as desired.

In testimony whereof I have signed my name to this specification in the presence of two subscribing witnesses

FRANK WOLF.

Witnesses:
A. MATHER,
WILLIS IMEL.